US008273849B2

(12) United States Patent
Kamps et al.

(10) Patent No.: US 8,273,849 B2
(45) Date of Patent: Sep. 25, 2012

(54) ISOSORBIDE-BASED POLYCARBONATES, METHOD OF MAKING, AND ARTICLES FORMED THEREFROM

(75) Inventors: Jan Henk Kamps, Bergen op Zoom (NL); Bernardus Jansen, Bergen op Zoom (NL); Hans-Peter Brack, Herrliberg (CH)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/893,500

(22) Filed: Sep. 29, 2010

(65) Prior Publication Data

US 2011/0160422 A1 Jun. 30, 2011

Related U.S. Application Data

(60) Provisional application No. 61/291,197, filed on Dec. 30, 2009.

(51) Int. Cl.
*C08G 64/00* (2006.01)
*C08G 63/02* (2006.01)
(52) U.S. Cl. ........ 528/201; 528/271; 528/272; 528/298; 528/361
(58) Field of Classification Search .................. 528/201, 528/298, 361
See application file for complete search history.

(56) References Cited

U.S. PATENT DOCUMENTS

| 4,506,066 | A | 3/1985 | Medem et al. |
| 6,486,294 | B1 | 11/2002 | Brack et al. |
| 6,600,004 | B1 | 7/2003 | McCloskey et al. |
| 7,041,775 | B2 | 5/2006 | Martinez et al. |
| 7,138,479 | B2 | 11/2006 | Dhara et al. |
| 7,666,872 | B2 | 2/2010 | Dunkern et al. |
| 2005/0143549 | A1 | 6/2005 | Schijndel et al. |
| 2005/0143554 | A1 | 6/2005 | Dhara et al. |
| 2006/0002814 | A1 | 1/2006 | Chatterjee et al. |
| 2006/0149024 | A1 | 7/2006 | Ono et al. |
| 2008/0015331 | A1 | 1/2008 | Terado et al. |
| 2008/0230751 | A1 | 9/2008 | Li et al. |
| 2008/0269386 | A1 | 10/2008 | Chakravarti et al. |
| 2009/0105393 | A1 | 4/2009 | Jensen et al. |
| 2009/0105443 | A1 | 4/2009 | Brack et al. |
| 2009/0105444 | A1 | 4/2009 | Chatterjee et al. |
| 2009/0312503 | A1 | 12/2009 | Brack et al. |
| 2010/0099832 | A1 | 4/2010 | Jansen et al. |
| 2011/0160422 | A1* | 6/2011 | Kamps et al. .................. 528/201 |

FOREIGN PATENT DOCUMENTS

| EP | 0524731 | A1 | 1/1993 |
| EP | 2033981 | A1 | 3/2009 |
| EP | 2053072 | A1 | 4/2009 |
| GB | 1079686 | | 8/1967 |
| JP | 200467990 | A | 3/2004 |
| JP | 2005132872 | A | 5/2005 |
| JP | 2006232897 | A | 9/2006 |
| JP | 2009063976 | A | 3/2009 |
| JP | 2009144013 | A | 7/2009 |
| JP | 2009191226 | A | 8/2009 |
| WO | 0210111 | A1 | 2/2002 |
| WO | 2005116110 | A1 | 12/2005 |
| WO | 2006036545 | A1 | 4/2006 |
| WO | 2008020636 | A1 | 2/2008 |

OTHER PUBLICATIONS

Japanese Publication No. 2009144013, Published Jul. 2, 2009, Abstract Only, 1 page.
Japanese Publication No. 2009191226, Published Aug. 27, 2009, Abstract Only, 1 page.
International Search Report; International Application No. PCT/US2010/062006; International Filing Date: Dec. 23, 2010; Date of Mailing: Mar. 24, 2011; 5 pages.
Written Opinion of the International Searching Authority; International Application No. PCT/US2010/062006; International Filing Date: Dec. 23, 2010; Date of Mailing: Mar. 24, 2011; 4 pages.
Japanese Publication No. 2004067990; Publication Date: Mar. 4, 2004; Abstract Only; 1 page.
International Publication No. 2005116110; Publication Date: Dec. 8, 2005; Abstract Only, 1 page.
Japanese Patent No. 2005132872 (A); Publication Date: May 26,2005; Machine Translation; 9 Pages.
Japanese Publication No. 2006232897; Publication Date: Sep. 7, 2006; Abstract Only; 2 Pages.
International Publication No. 2008020636 (A1); Publication Date: Feb. 21, 2008; Abstract Only; 1 page.
Japanese Publication No. 2009063976; Publication Date: Mar. 26, 2009; Abstract Only, 1 page.
Betiku et al.; "Synthesis and Characterization of Isosorbide Carbonate: Lactide Copolymers"; Polymer Preprints (American Chemical Society, Division of Polymer Chemistry); vol. 48, Issue 2; 2007; pp. 802-803; Abstract Only; Document No. XP002529896.
Braun, et al.; Polyesters with 1.43.8-dianhydrosobritol as Polymeric Plasticizers for PVC; Die Angewandte Makromolekulare Chemie; vol. 199; 1992; pp. 191-205.
Kambour et al.; "Tough, Transparent Heat- and Flame-Resistant Thermoplastics via Silicone Block-Modified Bisphenol Fluorenone Polycarbonate"; Journal of Applied Polymer Science; vol. 20; 1976; pp. 3275-3293.
Kricheldorf et al.; "Polymers of Carbonic Acid. 22. Cholesteric Polycarbonates Derived from (S)-((2-Methylbutyl)thio)hydroquinone or Isosorbide"; Macromolecules; vol. 29; 1996; pp. 8077-8082.
"Synthesis and characterization of isosorbide carbonate: lactide copolymers"; XP002529896, 2007; 2 pages.

* cited by examiner

*Primary Examiner* — Terressa Boykin
(74) *Attorney, Agent, or Firm* — Cantor Colburn LLP

(57) ABSTRACT

Disclosed herein is a polycarbonate polymer comprising: an isosorbide unit, and an aliphatic unit different from the isosorbide unit, wherein the isosorbide unit and aliphatic unit are each carbonate, or a combination of carbonate and ester units and the aliphatic unit is derived from an aliphatic oligomer having a molecular weight of 900 to 4000.

21 Claims, No Drawings

ISOSORBIDE-BASED POLYCARBONATES, METHOD OF MAKING, AND ARTICLES FORMED THEREFROM

CROSS REFERENCE TO RELATED APPLICATIONS

This application claims the benefit of U.S. Provisional Patent Application No. 61/291,197 filed on Dec. 30, 2009, which is incorporated by reference herein in its entirety.

BACKGROUND

This disclosure relates to polycarbonates comprising aliphatic diols, and in particular to isosorbide-based polycarbonates, and methods of manufacture thereof.

Polymers based on aliphatic diols derived from biologically-based sources are of great interest to the plastics industry and to the manufacturing industry, for the preparation of materials and products that can be derived from inexpensive, renewable sources and that also may be biodegradable, and thereby have a low net environmental impact. Of particular interest are polymers based on isosorbides, and more specifically referred to as 2,6-dioxabicyclo[3.3.0]octan-4,8-diol, 1,4:3,6-dianhydro-D-glucitol, and 2,3,3a,5,6,6a-hexahydrofuro[3,2-b]furan-3,6-diol, and isomers of these. These materials are of great interest to the chemical industry, and in particular in the production of polymeric materials such as polycarbonates, because such aliphatic diols can be produced from renewable resources, namely sugars, rather than from the petroleum feed stocks used to prepare other monomers useful in the production of polycarbonates, such as bisphenol monomers.

However, for practical applications, polycarbonate incorporating isosorbide needs a balance of properties to be useful. A problem that accompanies inclusion of such biologically derived materials in polycarbonates is maintaining the desired mechanical and optical properties of the polycarbonate during and after high temperature processing, such as encountered during extrusion and molding. Polycarbonate that include isosorbide that otherwise have desirable properties can have insufficient impact and heat resistance properties.

There accordingly remains a need in the art for an isosorbide-based polycarbonate having a sufficiently high heat resistance and impact performance, while retaining the desired optical properties and processing temperatures.

BRIEF DESCRIPTION

Described herein is a polycarbonate polymer comprising: an isosorbide unit and an aliphatic unit different from the isosorbide unit, wherein the isosorbide unit and aliphatic unit are each carbonate, or a combination of carbonate and ester units and the aliphatic unit is derived from an aliphatic oligomer having a weight average molecular weight of 900 to 4000. The polycarbonate can further comprise non-isosorbide aliphatic units derived from a $C_{14-44}$ aliphatic diacid, a $C_{14-44}$ aliphatic diol or combination of these.

In another embodiment, a thermoplastic composition comprises the polycarbonate polymer, and an additional polymer, an additive, or a combination of additional polymer and additive.

DETAILED DESCRIPTION

Described herein are isosorbide-based polycarbonates including polyester-polycarbonates. The polycarbonates and polyester-polycarbonates comprise units derived from isosorbide and aliphatic units derived from an aliphatic oligomer having a molecular weight of 900 to 4000. The inclusion of aliphatic units derived from an aliphatic oligomer results in a pronounced improvement in impact strength. Heat resistance is evaluated by a combination of glass transition temperature, heat deformation temperature and Vicat data. These physical properties and methods of determining them are discussed in greater detail below.

As used herein, the term "polycarbonate" includes copolycarbonates having repeating structural carbonate units of the formula (1):

wherein the $R^1$ groups comprise groups that are derived from isosorbide, diols derived aliphatic oligomers having a weight average molecular weight of 900 to 4000. The aliphatic oligomers comprise aliphatic dimers of $C_{30-45}$ aliphatic acids, aliphatic trimers of $C_{30-45}$ aliphatic acids and combinations of aliphatic dimers and trimers of $C_{30-45}$ aliphatic acids. The aliphatic oligomer may be modified with linear or cyclic aliphatic groups that are in addition to components derived from the dimers, trimers, or combination of dimers and trimers. $R^1$ groups may optionally include units that are derived from aromatic dihydroxy compounds, and non-isosorbide aliphatic units derived from a $C_{14-44}$ aliphatic diacid, a $C_{14-44}$ aliphatic diol or combination thereof.

The isosorbide-based carbonate units are shown in formula (2):

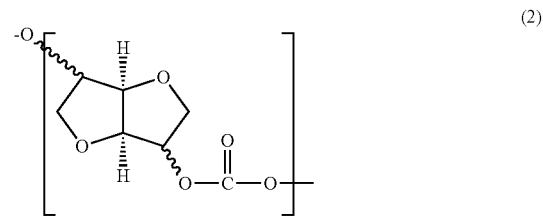

The isosorbide-based carbonate units of formula (2) can be derived from a mixture of isomers of isosorbide or from individual isomers of isosorbide. The stereochemistry for the isosorbide-based carbonate units of formula (2a) is not particularly limited. Specifically, isosorbide has the general formula (2a):

and can be a single diol isomer or mixture of diol isomers. The stereochemistry for the isosorbide of general formula (2a) is also not particularly limited. These diols are prepared by the dehydration of the corresponding hexitols. Hexitols are produced commercially from the corresponding sugars (aldohexose). Aliphatic diols of formula (2a) include 1,4; 3,6-dianhydro-D glucitol, of formula (2b); 1,4; 3,6-dianhydro-D mannitol, of formula (2c); and 1,4; 3,6-dianhydro-L iditol, of formula (2d), and combinations of two or more of the aforementioned diols. Isosorbides are available commercially from various chemical suppliers including Cargill, Roquette, and Shanxi.

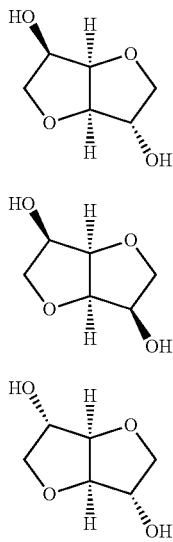

(2b)

(2c)

(2d)

In a specific embodiment, the diol of the formula (2b) is desirable because it is a rigid, chemically and thermally stable aliphatic diol that can be used to produce higher Tg copolymers than the other diols of formulas (2c) and (2d).

The isosorbide units can be present in an amount of 50 to 92 weight percent (wt %), specifically 60 to 90 wt %, and more specifically 70 to 90 wt % based on the total weight of diol and diacid used to make the polycarbonate.

The polycarbonate further comprises, in addition to carbonate units of formula (2), aliphatic units that are derived from aliphatic oligomers having a weight average molecular weight of 900 to 4000, or, specifically 900 to 3000, or more specifically, 900 to 2500. The aliphatic oligomers can comprise repeating units derived from aliphatic fatty acids. The aliphatic oligomers may be acid terminated which results in ester linkages or hydroxyl terminated which results in carbonate linkages.

The aliphatic oligomers may be linear or branched, difunctional alkylene or alkenylene compounds that have the basic formula (3):

X-L-X                                           (3)

wherein X represents a carboxylic acid (—C(O)OH) or a methylol group (CH$_2$—OH). L represents a group having greater than or equal to 60 carbon atoms. L may also include cyclic carbon substructures, specifically monocyclic, polycyclic, or fused polycyclic groups.

The aliphatic oligomers can be synthesized by the addition reaction of two or more unsaturated aliphatic acids. "Unsaturated", as used herein, can mean monounsaturated, diunsaturated, triunsaturated, polyunsaturated, or a combination of at least one of the foregoing. It will be understood that for unsaturated sites in the aliphatic diacid, the cis isomer, trans isomer, or a combination of cis and trans isomers can be present within reactant unsaturated aliphatic acid (such as where a single aliphatic diacid can have at least one each of a cis and trans isomerized double bond), or different isomers of unsaturated aliphatic acids may be combined (such as where a combination of a trans aliphatic acid and a cis aliphatic acid is used).

Reaction of two unsaturated aliphatic acids can be accomplished by a carbon-carbon bond forming reaction between unsaturated sites in different unsaturated aliphatic acids, and can result in formation of a single bond, multiple single bonds (where an at least diunsaturated aliphatic monomer is used), cyclodimerization to form a bridging carbocycle, or other such carbon-carbon bonding between the unsaturated aliphatic acids. It will be understood that such reactions can produce a mixture of products and isomers, and that all such combinations of products and isomers are contemplated herewith. The reaction between unsaturated diacids may be accomplished by radical initiation, metal catalysis, photoinitiation, acid catalysis, or any suitable method. In an embodiment, the reaction of unsaturated aliphatic acids to form aliphatic oligomer can be effected by use of a catalytic inorganic material including a clay having catalytic properties such as Montmorillonite. It is also possible that the aliphatic oligomer can be derived from the condensation of two shorter chain unsaturated aliphatic acids such as, for example, acrylic acid, methacrylic acid, crotonic acid, or the like, with one or more unsaturated compounds that do not have acid groups. It is desirable that the oligomer is derived from plant based biological sources (such as e.g., vegetable oils), but may also be preparable from other commercially available feedstocks such as petroleum derivatives, coal extracts, animal sources, other plant sources such as timber, and the like, and so should not be considered as limited to vegetable or crop sources. Aliphatic oligomers derived from natural sources are available commercially from chemical suppliers including Uniqema, Cognis, and Oleon.

The aliphatic oligomers can also be synthesized by coupling, through a condensation reaction such as an esterification reaction, two fatty acids where at least one fatty acid is functionalized. Exemplary linkages between fatty acids include ester linkages and ether linkages.

The aliphatic units derived from an aliphatic oligomer can be present in an amount of 5 to 35 wt %, specifically 6 to 25 wt %, and more specifically 7 to 20 wt % based on the total weight of diol and diacid used to make the polycarbonate.

The polycarbonate may further comprise non-isosorbide aliphatic units derived from a C$_{14-44}$ aliphatic diacid, a C$_{14-44}$ aliphatic diol or combination thereof. These units are described in U.S. Patent Publication No. 20090105393, which is incorporated by reference herein in its entirety. This patent publication discloses the C$_{14-44}$ aliphatic diacid or C$_{14-44}$ aliphatic diol is each a linear or branched, difunctional alkylene or alkenylene compound having the basic formula (4):

Y—(V)—Y                                           (4)

wherein each Y represents a carboxylic acid (—C(O)OH) or methylol (—CH$_2$OH) functional group (where each comprises a single carbon atom). In an embodiment, each Y is the same. V represents a linking group of greater than 11 carbon atoms. More specifically, V is a branched C$_{12-42}$ alkylene or C$_{12-42}$ alkenylene group. V may also include cyclic carbon substructures, specifically monocyclic, polycyclic, or fused polycyclic C$_{3-12}$ cycloalkyl, C$_{3-12}$ cycloalkenyl, C$_{3-12}$ cycloalkylidenyl, C$_{3-12}$ cycloalkylene, or C$_{3-12}$ cycloalkylenylene groups. In a specific embodiment, V is a C$_{12-42}$ alkylene group comprising two alkyl branches. In a specific embodiment, the compound of formula (4) can be a branched, dimeric fatty acid or alcohol having 35 to 44 carbons. In another embodiment, the compound of formula is a branched or linear dimeric fatty acid or alcohol having 13 to 18 carbons. A dimeric fatty acid or alcohol having 36-44 carbons must be branched to prevent crystallization of the alkylene or alkenylene chain.

The $C_{14-44}$ aliphatic diacid can be a branched chain dicarboxylic acid, and can contain a cyclic group. Specifically, in an embodiment, the aliphatic diacid is a $C_{14-44}$ aliphatic diacid or derivative thereof comprising the formula (5):

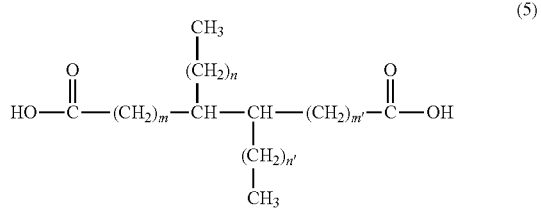
(5)

where m and m' are independently 0 to 38, n and n' are independently 0 to 38, and the sum m+m'+n+n' is an integer from 8 to 38. In a specific embodiment, a $C_{36}$ aliphatic diacid has the structure of formula (5), where m and m' are independently 0 to 30, n and n' are independently 0 to 30, and the sum m+m'+n+n' is 30. In another specific embodiment, a $C_{36}$ aliphatic diacid has the structure of formula (5), where each m and m' is independently 5 to 10, each n and n' is independently 5 to 10, and the sum m+m'+n+n' is 30. In an exemplary embodiment, m and m' are independently 7 or 8, n and n' are independently 7 or 8, and the sum m+m'+n+n' is 30. In a specific embodiment, a $C_{44}$ aliphatic diacid has the structure of formula (5), where m and m' are independently 0 to 30, n and n' are independently 0 to 30, and the sum m+m'+n+n' is 38. In an exemplary embodiment, m and m' are independently 12 or 13, n and n' are independently 6 or 7, and the sum m+m'+n+n' is 38. Such diacids are also referred to generally as dimeric fatty acids, and may be derived from the condensation of readily available biologically-derived feedstocks.

The non-isosorbide aliphatic units derived from a $C_{14-44}$ aliphatic diacid, a $C_{14-44}$ aliphatic diol or combination thereof can be present in an amount of 5 to 35 wt %, specifically 6 to 25 wt %, and more specifically 7 to 20 wt % based on the total weight of diol and diacid used to make the polycarbonate.

The polycarbonate can comprise a further carbonate unit derived from an aromatic dihydroxy compound (an aromatic unit), such as for example a bisphenol, The aromatic dihydroxy compound may be of the formula (6):

(6)

wherein each of $A^1$ and $A^2$ is a monocyclic divalent arylene group, and $Y^1$ is a single bond or a bridging group having one or two atoms that separate $A^1$ from $A^2$. In an exemplary embodiment, one atom separates $A^1$ from $A^2$. In another embodiment, when each of $A^1$ and $A^2$ is phenylene, $Y^1$ is para to each of the hydroxyl groups on the phenylenes. Illustrative non-limiting examples of groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ can be a hydrocarbon group or a saturated hydrocarbon group such as methylene, cyclohexylidene, or isopropylidene.

Included within the scope of formula (6) are bisphenol compounds of general formula (7):

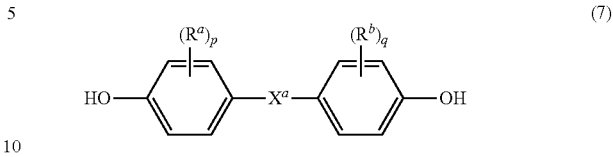
(7)

wherein $R^a$ and $R^b$ each represent a halogen atom or a monovalent hydrocarbon group and can be the same or different; p and q are each independently integers of 0 to 4; and $X^a$ represents a single bond or one of the groups of formulas (8a) or (8b):

(8a)

(8b)

wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. In particular, $R^c$ and $R^d$ are each the same hydrogen or $C_{1-4}$ alkyl group, specifically the same $C_{1-3}$ alkyl group, even more specifically, methyl.

In an embodiment, $R^c$ and $R^d$ taken together represent a $C_{3-20}$ cyclic alkylene group or a heteroatom-containing $C_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Exemplary heteroatoms in the heteroatom-containing cyclic alkylene group include —O—, —S—, and —N(Z)—, where Z is a substituent group selected from hydrogen, hydroxy, $C_{1-12}$ alkyl, $C_{1-12}$ alkoxy, or $C_{1-12}$ acyl.

In a specific exemplary embodiment, $X^a$ is a substituted $C_{3-18}$ cycloalkylidene of the formula (9):

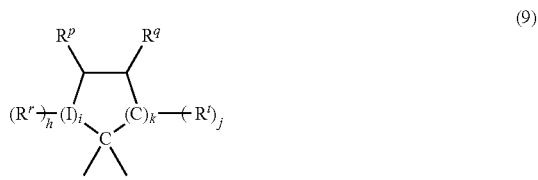
(9)

wherein each $R^r$, $R^p$, $R^q$, and $R^t$ is independently hydrogen, halogen, oxygen, or $C_{1-12}$ organic group; I is a direct bond, a carbon, or a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (9) will have an unsaturated carbon-carbon linkage where the ring is fused. When k is 1 and i is 0, the ring as shown in formula (9) contains 4 carbon atoms, when k is 2, the ring as shown contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group.

When k is 3 and i is 0, bisphenols containing substituted or unsubstituted cyclohexane units are used, for example bisphenols of formula (10):

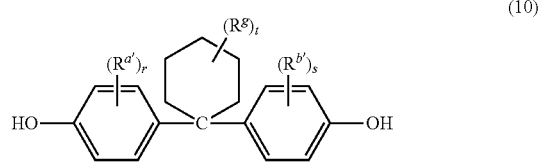

(10)

wherein substituents $R^{a'}$ and $R^{b'}$ can be aliphatic or aromatic, straight chain, cyclic, bicyclic, branched, saturated, or unsaturated, and $R^g$ is $C_{1-12}$ alkyl or halogen, r and s are independently integers from 0 to 4, and t is an integer of 0 to 10. It will be understood that hydrogen fills each valency when r is 0, s is 0, and t is 0. In one embodiment, each $R^{a'}$ and $R^{b'}$ is independently $C_{1-12}$ alkyl. In a specific embodiment, where r and/or s is 1 or greater, at least one of each of $R^{a'}$ and $R^{b'}$ are disposed meta to the cyclohexylidene bridging group. The substituents $R^{a'}$, $R^{b'}$, and $R^g$ may, when comprising an appropriate number of carbon atoms, be straight chain, cyclic, bicyclic, branched, saturated, or unsaturated. In a specific embodiment, $R^{a'}$, $R^{b'}$, and $R^g$ are each $C_{1-4}$ alkyl, specifically methyl. In still another embodiment, $R^{a'}$, $R^{b'}$, and $R^g$ is a $C_{1-3}$ alkyl, specifically methyl, r and s are 0 or 1, and t is 0 to 5, specifically 0 to 3. Useful cyclohexane-containing bisphenols of formula (10) where t is 3, r and s are 0, and $R^g$ is methyl include, for example those derived from the reaction product of two moles of a phenol with one mole of a hydrogenated isophorone such as e.g., 3,3,5-trimethylcyclohexanone, are useful for making polycarbonate polymers with high glass transition temperatures and high heat distortion temperatures.

Some illustrative, non-limiting examples of suitable bisphenol compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxy-3 methyl phenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

Specific examples of the types of bisphenol compounds represented by formula (6) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), and 9,9-bis(4-hydroxyphenyl)fluorene. Combinations comprising at least one of the foregoing dihydroxy aromatic compounds can also be used.

Other types of diols can be present in the isosorbide-based polycarbonate. For example, the polycarbonate can further comprise units derived from a dihydroxy aromatic compound of formula (11):

(11)

wherein each $R^f$ is independently $C_{1-12}$ alkyl, or halogen, and u is 0 to 4. It will be understood that $R^f$ is hydrogen when u is 0. Typically, the halogen can be chlorine or bromine. In an embodiment, compounds of formula (11) in which the —OH groups are substituted meta to one another, and wherein $R^f$ and u are as described above, are also generally referred to herein as resorcinols. Examples of compounds that can be represented by the formula (11) include resorcinol (where u is 0), substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Carbonate units derived from an aromatic dihydroxy compound (aromatic units) can be present in an amount of 0 to 50 wt %, specifically 0 to 40 wt %, and more specifically 0 to 30 wt % based on the total weight of diol and diacid used to make the polycarbonate.

Various types of polycarbonates with branching groups are also contemplated as being useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethyl benzyl)phenol), 4-chloroformyl phthalic anhydride, trimesic acid, and benzophenone tetracarboxylic acid. The branching agents can be added at a level of about 0.05 to about 2.0 wt %. Mixtures comprising linear polycarbonates and branched polycarbonates can be used.

As mentioned above, polycarbonates also include copolymers comprising carbonate units and ester units, and combinations comprising at least one of homopolycarbonates and copolycarbonates. A specific type of polycarbonate copolymer of this type is a polyester carbonate, also known as a polyester-polycarbonate. Such copolymers further contain, in addition to recurring carbonate chain units of the formula (1), carbonate units derived from oligomeric ester-containing dihydroxy compounds (also referred to herein as hydroxy end-capped oligomeric arylate esters) comprising repeating units of formula (9):

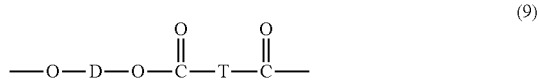

(9)

wherein D is a divalent group derived from a dihydroxy compound, and may be, for example, a $C_{2-120}$ alkylene group, a $C_{6-120}$ alicyclic group, a $C_{6-120}$ aromatic group or a $C_{2-200}$ polyoxyalkylene group in which the alkylene groups contain 2 to about 6 carbon atoms, specifically 2, 3, or 4 carbon atoms; and T is a divalent group derived from a dicarboxylic acid, and may be, for example, a $C_{2-120}$ alkylene group, a $C_{6-120}$ alicyclic group, a $C_{6-120}$ alkyl aromatic group, or a $C_{6-120}$ aromatic group.

Generally, polyester-polycarbonates can have the structure of formula (9) where in some embodiments D is a $C_{2-120}$ alkylene group having a straight chain, branched chain, or cyclic (including polycyclic) structure. In other embodiments, D is derived from a dihydroxy aromatic compound of formula (3) above. In yet other embodiments, D is derived from a dihydroxy aromatic compound of formula (7) above. In a specific embodiment, as disclosed herein, D is a group derived from an aliphatic diol of formula (2a). Where the aliphatic chain is long, for example greater than about 18 carbon atoms, it is necessary that it is branched to prevent crystallization. Thus, in a specific embodiment, D is a $C_{14}$-$C_{120}$ alkylene group having a branched chain structure, such that the aliphatic alkylene chain will not crystallize in the polymer.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another specific embodiment, D is a $C_{2-6}$ alkylene group and T is p-phenylene, m-phenylene, naphthalene, a divalent cycloaliphatic group, or a combination thereof. This class of polyester includes the poly(alkylene terephthalates).

Where ester units are formed in the absence of other linking chemistry (e.g., carbonate precursors such as phosgene, or diaryl carbonates), the individual ester oligomerize to form a polyester unit, also referred to as a polyester block. The polyester unit can then be copolymerized in the presence of carbonate precursor and dihydroxy compounds to form the polyester-polycarbonate. The number of repeating ester units in a polyester unit of such a polyester-polycarbonate is typically greater than or equal to 4, specifically greater than or equal to 5, and more specifically greater than or equal to 8. Also in an embodiment, the number of ester units of formula (9) is less than or equal to 100, specifically less than or equal to 90, more specifically less than or equal to 70. It will be understood that the low and high endpoint values for the number of ester units of formula (9) present are independently combinable. In a specific embodiment, the number of ester units of formula (9) in a polyester-polycarbonate can be 4 to 50, specifically 5 to 30, more specifically 8 to 25, and still more specifically 10 to 20. Conversely, where ester units are formed in the presence of other linking chemistry such as carbonate precursors, a more random polyester-polycarbonate can form, with individual ester units or smaller blocks of repeating ester units of 2 or 3, interspersed with one or more of the other linking chemistry (e.g. carbonate units). Overall, in the polyester-polycarbonate, the molar ratio of ester units to carbonate units in the polyester-polycarbonate copolymers may vary broadly, for example 1:99 to 99:1, specifically 10:90 to 90:10, more specifically 25:75 to 75:25, depending on the desired properties of the final composition.

The ester units of a polyester-polycarbonate may be derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol-A. In a specific embodiment, the carbonate units of a polyester-polycarbonate can be derived from aliphatic diols of formula (2a). Alternatively or in addition, in an exemplary embodiment, the carbonate units can be derived from resorcinol and/or bisphenol A. In another exemplary embodiment, the carbonate units of the polyester-polycarbonate can be derived from resorcinol and bisphenol A in a resulting molar ratio of resorcinol carbonate units to bisphenol A carbonate unit of 1:99 to 99:1.

The calculated content of biologically derived material in the isosorbide-based polycarbonate (the calculated bio-content) can be greater than or equal to 20 weight percent (wt %), specifically greater than or equal to 40 wt %, more specifically greater than or equal to 60 wt %, and still more specifically greater than or equal to 65 wt %, based on the total weight of the isosorbide-based polycarbonate.

The bio-content expressed in weight percent represents the combined weight of isosorbide units and any other units derived from renewable materials in the polycarbonate divided by the total weight of the polycarbonate. Bio-content can also be determined using radiocarbon and isotope ratio mass spectrometry to determine the carbon fraction in a material that is coming from renewable sources (see, for example ASTM D6866-06a).

Molecular weight for the polycarbonates, including the isosorbide-based polycarbonates disclosed herein, can be determined by gel permeation chromatography using calibration methods based on well defined polystyrene (PS) standards of narrow molar mass distribution. Generally polycarbonates can have a weight average molecular weight (Mw), of greater than about 5,000 g/mol relative to PS standards. In an embodiment, the isosorbide-based polycarbonates can have an Mw of greater than or equal to about 39,000 g/mol, relative to PS standards. In a specific embodiment, the isosorbide-based polycarbonate (including isosorbide-based polyester-polycarbonate) has an Mw based on PS standards of 39,000 to 100,000 g/mol, specifically 40,000 to 90,000 g/mol, more specifically 40,000 to 80,000 g/mol, and still more specifically 40,000 to 70,000 g/mol.

In an embodiment, the isosorbide-based polycarbonate has a number averaged molecular weight (Mn) based on PS standards of 15,000 to 65,000 g/mol, specifically 16,000 to 60,000 g/mol, more specifically 17,000 to 55,000 g/mol, and still more specifically 18,000 to 50,000 g/mol.

Molecular weight (Mw and Mn) as described herein is as determined using gel permeation chromatography (GPC), using a crosslinked styrene-divinylbenzene column, and either PS or PC standards as specified. GPC samples are prepared in a solvent such as methylene chloride or chloroform at a concentration of about 1 mg/ml, and are eluted at a flow rate of about 0.2 to 1.0 ml/min.

The glass transition temperature (Tg) of the isosorbide-based polycarbonates can be 90 to 170° C. Within this range, the glass transition temperature of the isosorbide-based polycarbonate can be 135 to 170° C., specifically 142 to 170° C.

The heat deflection temperature (HDT) of the isosorbide-based polycarbonates can be 30 to 180° C. Within this range the HDT can be 50 to 150° C., specifically 75 to 125° C.

The polycarbonates can have a melt volume ratio (MVR) of 0.5 to 80, more specifically 2 to 40 cm$^3$/10 minutes, measured at 250° C. under a load of 5 kg according to ASTM D1238-04.

The polycarbonates can have a notched Izod impact strength greater than or equal to 13 kilojoules per square meter (kJ/m$^2$) at 23° C. Within this range the notched Izod impact strength can be greater than or equal to 20 kJ/m$^2$, specifically greater than or equal to 30 kJ/m$^2$. Notched Izod impact strength is determined according to ISO 180/1A. The notched Izod impact strength of the polycarbonate can be less than or equal to 200 kJ/m$^2$.

Polycarbonates, other than the isosorbide-based polycarbonates disclosed herein, can typically be manufactured using an interfacial phase transfer process or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium such as for example methylene chloride, and contacting the reactants with a carbonate precursor (such as phosgene) in the presence of a catalyst such as, for example, triethylamine or a phase transfer catalyst salt, under controlled pH conditions, e.g., about 8 to about 10.

However, as disclosed in U.S. Patent Publication Nos. 20090105393 and 20090105444, JP2009-191226 and JP2009-144013, the isosorbide-based polycarbonate or polyester-polycarbonate can be prepared by a melt polymerization process. Generally, in the melt polymerization process, polycarbonates are prepared by co-reacting, in a molten state, the dihydroxy reactant(s) (i.e., isosorbide, aliphatic diol and/or aliphatic diacid, and any additional dihydroxy compound) and a diaryl carbonate ester, such as diphenyl carbonate, or more specifically in an embodiment, an activated carbonate such as bis(methyl salicyl) carbonate, in the presence of a transesterification catalyst. Volatile monohydric phenol is removed from the molten reactants by distillation and the polymer is isolated as a molten residue. Methods of polymerization are described in greater detail in U.S. Patent Publication Nos. 20090105393 and 20090105444, which are incorporated by reference herein in their entirety.

In addition to the isosorbide-based polycarbonates described above, thermoplastic compositions comprising combinations of the isosorbide-based polycarbonate with other thermoplastic polymers that do not comprise the isosorbide-based carbonate units of formula (1) can be prepared using, for example other polycarbonates including homopolycarbonates and other polycarbonate copolymers (i.e., copolycarbonates) comprising different R$^1$ moieties in the carbonate units, polysiloxane-polycarbonates, polyester-carbonates (also referred to as a polyester-polycarbonates), polyesters, impact modifiers, or a combination comprising at least one of the foregoing additional polymers. These combinations can comprise 1 to 99 wt %, specifically 10 to 90, more specifically 20 to 80 wt % of the isosorbide-based polycarbonate, with the remainder of the compositions being other of the foregoing additional polymers, and/or additives as described below. In an embodiment, the thermoplastic composition comprises the isosorbide-based polycarbonate, an additional polymer, and/or an additive. In another specific embodiment, the thermoplastic composition comprising the isosorbide-based polycarbonates has a total biocontent of greater than or equal to 50 wt %, specifically greater than or equal to 55 wt %, more specifically greater than or equal to 60 wt %, and still more specifically greater than or equal to 65 wt %, based on the total weight of isosorbide-based polycarbonate, any additional polymer, and an additive exclusive of and prior to addition of any filler.

For example, the thermoplastic composition can further include as an additional polymer an impact modifier(s). Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

In some embodiments a thermoplastic composition comprises a homopolycarbonate comprising units derived from an aromatic dihydroxy compound and a copolymer comprising isosorbide units and aliphatic units derived from an aliphatic oligomer having a weight average molecular weight of 900 to 4000. The copolymer comprising isosorbide units and aliphatic units derived from an aliphatic oligomer having a weight average molecular weight of 900 to 4000 can further comprise non-isosorbide aliphatic units derived from a C$_{14-44}$ aliphatic diacid, a C$_{14-44}$ aliphatic diol or combination of these, aromatic units. The homopolycarbonate can be present in an amount of 10 to 80 wt %, specifically, 20 to 70 wt %, or, more specifically 25 to 65 wt %, based on the combined weight of the homopolycarbonate and copolymer. The copolymer can be present in an amount of 20 to 90 wt %, specifically 30 to 80 wt %, or, more specifically 35 to 75 wt %, based on the combined weight of the homopolycarbonate and copolycarbonate.

In addition to the isosorbide-based polycarbonate, the thermoplastic composition can include various additives ordinarily incorporated in resin compositions of this type, with the proviso that the additives are selected so as to not significantly adversely affect the desired properties of the thermoplastic composition. Combinations of additives can be used. Such additives can be mixed at a suitable time during the mixing of the components for forming the composition. Exemplary additives are described in U.S. Patent Publication Nos. 20090105393 and 20090105444.

Thermoplastic compositions comprising the isosorbide-based polycarbonate can be manufactured by various methods. For example, powdered isosorbide-based polycarbonate, other polymer (if present), and/or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

The homo and copolycarbonates may be used in making various articles including, but not limited to a film, a sheet, an optical wave guide, a display device and a light emitting diode prism. Furthermore the polycarbonates may further be used in making articles such as, exterior body panels and parts for outdoor vehicles and devices including automobiles, protected graphics such as signs, outdoor enclosures such as telecommunication and electrical connection boxes, and construction applications such as roof sections, wall panels and glazing. Multilayer articles made of the disclosed polycarbonates particularly include articles which will be exposed to UV-light, whether natural or artificial, during their lifetimes, and most particularly outdoor articles; i.e., those intended for outdoor use. Suitable articles are exemplified by automotive, truck, military vehicle, and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desktop computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications.

The isosorbide-based polycarbonates are further illustrated by the following non-limiting examples.

The polycarbonate compositions in mole percent (mol %) describes the composition of all dihydroxy functional monomers used in making the polycarbonate. This composition corresponds closely to the composition of the resulting polymer as determined by $^1H$ NMR for the majority of the samples. Polycarbonate composition in weight percent (wt %) are approximate and rounded numbers, calculated from the monomer composition in moles. Bio content in wt % was calculated by dividing the mass of isosorbide, Priplast™ and Pripol™ derived atoms by the total mass of the entire polymer chain. End groups were not considered in calculations of bio-content, composition in mol %, and composition in weight percent. A sample calculation is shown below. The bio-content in weight percent is the sum of the last column shown in the calculation table.

| | Molar Composition | Bio | Bio wt % calculation | | | | |
|---|---|---|---|---|---|---|---|
| | | | Formula | Formula weight | Contribution to | | |
| | Quantity (mol %) | ingredient (Y/N) | weight (g/mol) | in chain* (g/mol) | total formula weight** (g/mol) | Wt % | Wt % bio-content |
| Isosorbide | 50.00 | Y | 146.14 | 144.14 | 36.04 | 33.80 | 33.80 |
| Priplast, Pripol | 0.00 | Y | 566.95 | 532.95 | 0.00 | 0.00 | 0.00 |
| BPA | 50.00 | N | 228.29 | 226.29 | 56.57 | 53.06 | 0.00 |

-continued

| Molar Composition | | Bio | Formula | Formula weight | Contribution to | | |
|---|---|---|---|---|---|---|---|
| | | Bio wt % calculation | | | | | |
| | Quantity (mol %) | ingredient (Y/N) | weight (g/mol) | in chain* (g/mol) | total formula weight** (g/mol) | Wt % | Wt % bio-content |
| Siloxane | 0.00 | N | 3679 | 3677 | 0.00 | 0.00 | 0.00 |
| C=O | 100.00 | N | 28.01 | 28.01 | 14.01 | 13.14 | 0.00 |

*formula weight of monomer minus the formula weight of leaving group from polymerization
**formula weight in chain x (mol % of monomer/total mol %)

Isosorbide is abbreviated as IS. Bisphenol A is abbreviated as BPA. Pripol 1009 is a branched fatty acid dimer consisting of 36 carbon atoms. Priplast™ 3162 is an oligomer of dimerized fatty acids with average molar mass of approximately 1000 grams per mole (g/mol). Priplast™ 1838 is an oligomer of dimerized fatty acids with average molar mass of approximately 2000 g/mol. Priplast™ 3196 is an oligomer of dimerized fatty acids with an average molar mass of approximately 3000 g/mol.

The polycarbonates were made in melt by adding 101-103% of carbonate precursor (bis(methylsalicyl) carbonate (BMSC)) to the total of 100 mol % of dihydroxy and acid functional monomers. A 200 liter stainless steel stirred tank reactor was charged with BMSC, isosorbide, aliphatic units and optionally BPA. No catalyst was added to the reactor. The reactor was then evacuated and purged with nitrogen three times to remove residual oxygen and then put to a constant pressure of 800 mbar. Then the temperature was increased to 130° C. in order to melt and to dissolve the monomers. The temperature was then reduced to 100° C. The monomer mixture was then pumped to a PFR (plug flow reactor). At the start of the PFR there is continuous addition of an aqueous solution of sodium hydroxide to the monomer mix using a HPLC pump. The PFR is operated at 180° C.-200° C. and a pressure of 4-5 bar. The oligomer out of the PFR is transferred to a flash devolatilisation system.

The flash devolatilization system consists of a pre-heater and a flash vessel. The pre-heater is operated at approximately 240° C. and 200 mbar, the flash vessel is operated at 190° C. and 180 mbar. Under the flash vessel there is a melt pump which transfers the material to the extruder. The extruder was a Werner & Pfleiderer ZSK25WLE 25 mm 13-barrel twin-screw extruder with an L/D=59. The reaction mixture was reactively extruded at a 250-rpm screw speed. The extruder barrels were set to 270° C. and the die was set to 280° C. The extruder was equipped with five forward vacuum vents and one back-vent. The extruder has one vacuum systems called hi-vac, all the vent are connected to this system and have a vacuum of ~1 mbar The methyl salicylate byproduct was removed via devolatilization through these vents. Collected at the end of the extruder through a die were molten strands of polymer that were solidified through a water bath and pelletized.

The polycarbonate was extruded using the conditions described below on a twin screw extruder. During extrusion, 0.02% weight percent of a 45 weight percent $H_3PO_3$ solution in water was added to stabilize the polymer and minimize degradation. 0.3 weight percent PETS was added as a mold release agent. Weight percents are based on the total weight of the composition. No other additives and/or colorants were used. Materials were extruded on a twin screw extruder using the following settings:

| Temperature zone 1 | 50° C. | Temperature zone 5 | 280° C. |
| Temperature zone 2 | 200° C. | Temperature zone 6 | 280° C. |
| Temperature zone 3 | 250° C. | Temperature zone 7 | 280° C. |
| Temperature zone 4 | 270° C. | Temperature zone 8 | 280° C. |
| Speed | 300 rpm | | |
| Vacuum | full | | |

Molding was done using these settings:
Temperature zone 1: 240° C.
Temperature zone 2: 250° C.
Temperature zone 3: 260° C.
Temperature zone 4: 250° C.
Temperature mold: 60-70° C.
Injection Speed: 35-50 mm/s
After pressure: Between 50 and 70 bars
Drying time: 6 hours at 85° C.
Molding was done using these settings:
Temperature zone 1: 240° C.
Temperature zone 2: 250° C.
Temperature zone 3: 260° C.
Temperature zone 4: 250° C.
Temperature mold: 60-70° C.
Injection Speed: 35-50 mm/s
After pressure: Between 50 and 70 bars
Drying time: 6 hours at 85° C.

Vicat softening temperature was determined according to ISO306 using a heating rate of 120° C./hour and a force of 50 Newtons. Test specimens of 10×10×4 mm were cut from molded 80×10×4 mm ISO impact bars. Each test was repeated and the average of the two results was reported.

Heat deflection temperature was determined according to ISO75:2004 using 1.8 megaPascal (Mpa) stress on the flat surface (method A). Measurements were performed on molded ISO bars (80×10×4 mm) which were preconditioned at 23° C. and 50% relative humidity for 48 hours. The heating medium of the HDT equipment was mineral oil. Measurements were performed in duplicate and the average value was reported.

Glass transition temperature (Tg) was determined using differential scanning calorimetry (DSC) with a heating rate of 10° C./minute and using the second heating curve for Tg determination.

Notched Izod impact was determined according to ISO 180:2000, method A test protocol. The test was repeated five times on 80×10×3 mm molded impact bars which had been notched. The test specimens were conditioned at 23° C. and 50% relative humidity for 48 hours. The impact velocity was 3.5 m/s with a pendulum energy of 5.5 J. The clamping height was 40 mm. The test was conducted at 23° C. Results are reported as the average of the five measurements in the unit kilojoules per square meter. All test specimens broke completely.

Tensile modulus, stress at yield, stress at break and strain at break were determined according to ISO527. The tensile speed was 1 millimeter/minute for testing modulus and 50 millimeters/minute for the other properties. Samples were conditioned for 2 days at 23° C. and 50% relative humidity prior to testing.

Appearance was visually evaluated. A sample was considered transparent if the text on a piece of paper placed behind the sample could be read.

TABLE 1

|  | 1* | 2 | 3 | 4 | 5 | 6 | 7 | 8 |
|---|---|---|---|---|---|---|---|---|
| IS Content | 80 | 80 | 80 | 80 | 80 | 80 | 80 | 80 |
| Aliphatic Oligomer |  | Priplast ™ 3162 | Priplast ™ 3186 | Priplast ™ 1838 | Priplast ™ 3196 | Priplast ™ 1838 | Priplast ™ 1838 | Priplast ™ 1838 |
| Amount of aliphatic oligomer |  | 20 | 20 | 20 | 20 | 10 | 5 | 15 |
| $C_{14-44}$ aliphatic diol | Pripol ™ 1009 |  |  |  |  | Pripol ™ 1009 | Pripol ™ 1009 | Pripol ™ 1009 |
| Amount of $C_{14-44}$ aliphatic diol | 20 |  |  |  |  | 10 | 15 | 5 |
| Appearance | T | T | T | T | O | T | T | T |
| Mw | 39965 | 50719 | 53552 | 40847 | 21994 | 43741 | 37641 | 42253 |
| Mn | 17355 | 20295 | 13653 | 10724 | 9261 | 17725 | 16506 | 17279 |
| Pd | 2.3 | 2.5 | 3.9 | 3.8 | 2.4 | 2.5 | 2.3 | 2.4 |
| Tg | 117 | 135 | 153 | 165 | 162 | 137 | 129 | 154 |

T = transparent; O = opaque
*Comparative Example

TABLE 2

|  |  | 9* | 10* | 11* |
|---|---|---|---|---|
| IS content | Wt % | 65 | 80 | 93 |
| BPA content | Wt % | 28 | 13 | 0 |
| Pripol 1009 content | Wt % | 7 | 7 | 7 |
| Appearance |  | Transparent | Transparent | Transparent |
| Bio content | Wt % |  | 73 | 86 |
| Mw (PS) | g/mol | 53000 | 50074 | 55000 |
| Tensile modulus | MPa | 2500 | 2713 | 2675 |
| Stress@yield | MPa | 72 | 79 |  |
| Stress@break | MPa | 52 | 54 |  |
| Strain@break | % | 5.4 | 16 |  |

Examples 1-8 were prepared on a 25 gram scale. Examples 1-5 demonstrate the effect of chain length of the non-isosorbide aliphatic portion on transparency and glass transition temperature. As chain length of the oligomer increases to a Mn of 2000 (Ex. 4), glass transition temperature increases demonstrating the limitation in miscibility. When the oligomer chain length increases further to a Mn of 3000 (Ex. 5), the glass transition temperature plateaus but the transparency decreases. Examples 6-8 demonstrate the effect of using a combination of an aliphatic oligomer with a $C_{14-44}$ aliphatic diacid, $C_{14-44}$ aliphatic diol or combination thereof. By varying the amount of the $C_{14-44}$ aliphatic component, the glass transition temperature can be targeted and the transparency maintained.

TABLE 2-continued

|  |  | 9* | 10* | 11* |
|---|---|---|---|---|
| Impact strength@23° C. | kJ/m² | 3 | 4 | 3.5 |
| HDT | ° C. | 75 | 82 | 80 |
| Vicat | ° C. | 103 | 105 | 111 |
| Tg (DSC) | ° C. | 118 | 118 | 119 |

*Comparative Examples

Examples 9-11 are comparative examples which were made using a $C_{36}$ diol. These examples all demonstrate a lower glass transition temperature than the examples in the preceding table. They also demonstrate lower heat distortion temperature compared to the samples in Table 3.

TABLE 3

|  |  | 12 | 13 | 14 | 15 | 16 | 17 |
|---|---|---|---|---|---|---|---|
| IS | Mole % | 98 | 98.5 | 95.5 | 93 | 96.25 | 97 |
| BPA | Mole % |  |  |  |  |  |  |
| Pripol 1009 | Mole % |  |  | 3.5 | 3.5 | 3.15 |  |
| Priplast 1838 | Mole % | 2 |  | 1 | 3.5 | 0.6 |  |
| Priplast 3196 | Mole % |  | 1.5 |  |  |  |  |
| Priplast 3162 | Mole % |  |  |  |  |  | 3 |
| Appearance |  | O | O | T | O | T | T |
| Bio content | Wt % | 87 | 87 | 86 | 87 | 85.9 | 85.9 |
| Pripol + Priplast content | Wt % | 20 | 20 | 20 | 40 | 15 | 15 |
| Mw | g/mol | 57014 | 55540 | 41607 | 43317 | 48751 | 51004 |
| Tensile modulus | MPa | 2230 | 1940 | 2390 |  | 2808 | 2798 |
| Stress@yield | MPa | 33 | 33 | 65 |  | 76.7 | 75.6 |
| Stress@break | MPa | 30 | 31 | 51 |  | 59.9 | 47.3 |
| Strain@break | % | 1.7 | 2.3 | 4.8 |  | 9.7 | 16.3 |
| Impact strength@23 C. | kJ/m² | 30 | 17 | 14 |  | 30.3 | 46.5 |

TABLE 3-continued

|  |  | 12 | 13 | 14 | 15 | 16 | 17 |
|---|---|---|---|---|---|---|---|
| HDT | °C. |  |  | 105.9 |  | 104.6 | 104.0 |
| Vicat | °C. | 94 | 101 | 126 |  | 132.2 | 124.1 |
| Tg | °C. | 165 | 157 | 150 | 150 |  |  |

O = opaque; T = transparent

Example 16 shows that excellent results are obtained when the copolymer comprises an aliphatic block having a molecular weight greater than 1000 and an aliphatic block having 36 carbons. Example 17, when compared to Example 16, shows that an even higher impact strength can be obtained when the copolymer comprises an aliphatic block having a molecular weight of approximately 1000 but does not comprise an aliphatic block having 36 carbons. These results indicate that molecular weight of the oligomer is an important factor to obtaining materials having the desired properties.

The singular forms "a," "an," and "the" include plural referents unless the context clearly dictates otherwise. Unless defined otherwise, technical and scientific terms used herein have the same meaning as is commonly understood by one of skill in the art to which this invention belongs. The endpoints of all ranges directed to the same component or property are inclusive and independently combinable (e.g., ranges of "less than or equal to about 25 wt %, or, more specifically, about 5 wt % to about 20 wt %," is inclusive of the endpoints and all intermediate values of the ranges of "about 5 wt % to about 25 wt %," etc.). The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. As used herein, the term "hydrocarbyl" refers broadly to a substituent comprising carbon and hydrogen, optional with at least one heteroatoms, for example, oxygen, nitrogen, halogen, or sulfur; "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—). Where used, wavy bonds in structural formulas are included as generally in the art to show single bonds with unspecified stereochemistry.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A polycarbonate polymer comprising: an isosorbide unit and an aliphatic unit different from the isosorbide unit, wherein the isosorbide unit and aliphatic unit are each carbonate, or a combination of carbonate and ester units and the aliphatic unit is derived from an aliphatic oligomer having a weight average molecular weight of 900 to 4000, wherein the polycarbonate polymer has a glass transition temperature of 142 to 170° C.

2. The polycarbonate polymer of claim 1, wherein the isosorbide units are present in an amount of 50 to 92 weight percent based on the total weight of diol and diacid used to make the polycarbonate.

3. The polycarbonate of a claim 1, wherein the aliphatic oligomer has a weight average molecular weight of 900 to 3000.

4. The polycarbonate of claim 1, wherein the aliphatic oligomer has a weight average molecular weight of 900 to 2500.

5. The polycarbonate of claim 1, wherein the aliphatic units derived from an aliphatic oligomer are present in an amount of 5 to 35 wt % based on the total weight of diol and diacid used to make the polycarbonate.

6. The polycarbonate of claim 1, wherein the aliphatic units derived from an aliphatic oligomer having the formula X-L-X wherein X represents a carboxylic acid (—C(O)OH) or a methylol group (CH$_2$—OH) and L represents a group having greater than or equal to 60 carbon atoms.

7. The polycarbonate of claim 1, further comprising a carbonate unit derived from an aromatic dihydroxy compound.

8. The polycarbonate of claim 1, wherein the polycarbonate has bio-content greater than or equal to 20 weight percent based on the total weight of the polycarbonate.

9. The polycarbonate of claim 1, wherein the polycarbonate has a heat deflection temperature of 30 to 180° C.

10. The polycarbonate of claim 1, wherein the polycarbonate has a notched Izod impact strength greater than or equal to 13 kilojoules per square meter (kJ/m$^2$) at 23° C.

11. The polycarbonate of claim 1, further comprising non-isosorbide aliphatic units derived from a $C_{14-44}$ aliphatic diacid, a $C_{14-44}$ aliphatic diol or combination of these.

12. The polycarbonate of claim 1, wherein the polycarbonate is transparent.

13. An article comprising the polycarbonate of claim 1.

14. A polycarbonate polymer comprising: 50 to 92 weight percent of an isosorbide unit and 5 to 35 weight percent of an aliphatic unit different from the isosorbide unit, wherein the isosorbide unit and aliphatic unit are each carbonate, or a combination of carbonate and ester units, the aliphatic unit is derived from an aliphatic oligomer having a weight average molecular weight of 900 to 4000 and weight percent is based on the total weight of diol and diacid used to make the polycarbonate, wherein the polycarbonate polymer has a glass transition temperature of 142 to 170° C.

15. The polycarbonate of claim 14, further comprising 5 to 35 weight percent of a non-isosorbide aliphatic unit derived from a $C_{14-44}$ aliphatic diacid, a $C_{14-44}$ aliphatic diol or combination of these.

16. The polycarbonate of claim 14, further comprising a carbonate unit derived from an aromatic dihydroxy compound.

17. The polycarbonate of claim 14, wherein the polycarbonate has bio-content greater than or equal to 20 weight percent based on the total weight of the polycarbonate.

18. The polycarbonate of claim 14, wherein the polycarbonate has a notched Izod impact strength greater than or equal to 13 kilojoules per square meter ($kJ/m^2$) at 23° C.

19. The polycarbonate of claim 14, wherein the polycarbonate has a heat deflection temperature of 30 to 180° C.

20. The polycarbonate of claim 1, wherein the aliphatic units derived from the aliphatic oligomer are present in an amount of 10 to 35 wt % based on the total weight of diol and diacid used to make the polycarbonate.

21. The polycarbonate of claim 1, wherein the polycarbonate is phase separated.

* * * * *